United States Patent [19]

Dumler

[11] 4,017,998
[45] Apr. 19, 1977

[54] FISHING ROD HOLDER

[76] Inventor: Donald C. Dumler, 3623 W. North Lane, Phoenix, Ariz. 85021

[22] Filed: Jan. 28, 1976

[21] Appl. No.: 652,989

[52] U.S. Cl. .............................. 43/21.2; 248/514; 248/523

[51] Int. Cl.² ........................................ A01K 97/10

[58] Field of Search ............ 43/21.2; 248/514, 523, 248/224

[56] References Cited

UNITED STATES PATENTS

| 1,720,309 | 7/1929 | Wakefield | 248/224 X |
| 2,548,351 | 4/1951 | Coombs | 43/21.2 X |
| 2,954,909 | 10/1960 | Miller et al. | 248/514 X |
| 3,161,390 | 12/1964 | Larson | 43/21.2 X |
| 3,802,112 | 4/1974 | Banner | 43/21.2 |
| 3,897,922 | 8/1975 | Keen | 248/514 |

Primary Examiner—Louis G. Mancene
Assistant Examiner—Daniel J. Leach
Attorney, Agent, or Firm—Drummond, Nelson & Ptak

[57] ABSTRACT

A frame carries a tubular socket which receives the handle of a fishing rod. Camming means secure the handle within the socket. The socket is retained in a vertical position by a detent and pivotal therefrom to the inclined position against a stop. Mounting means is provided for securing the device to a boat or other selected surface.

6 Claims, 12 Drawing Figures

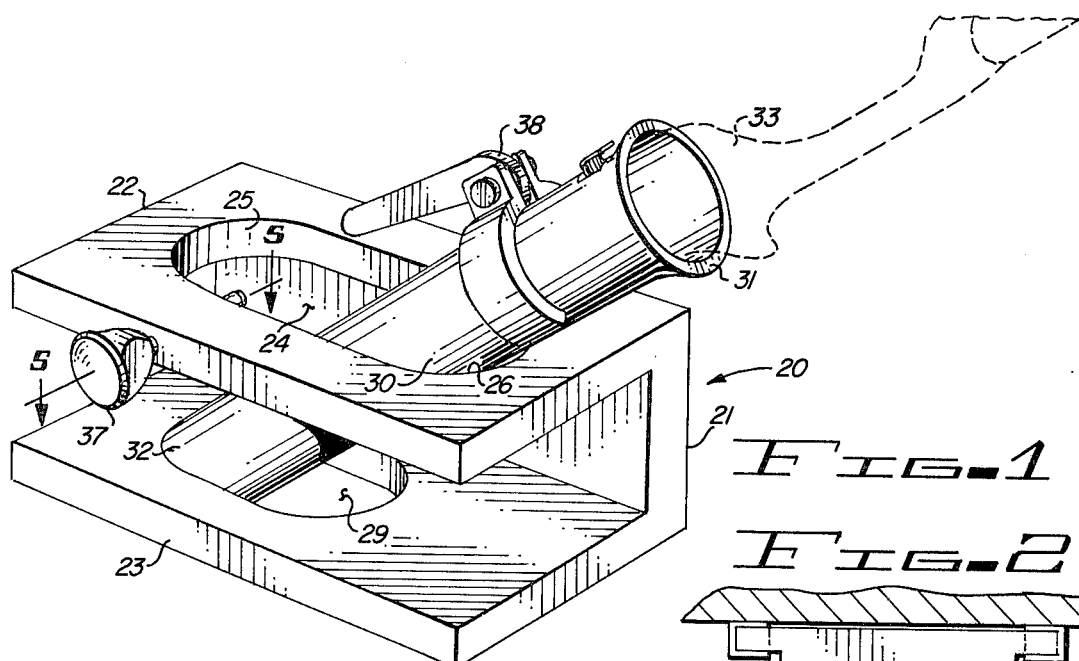
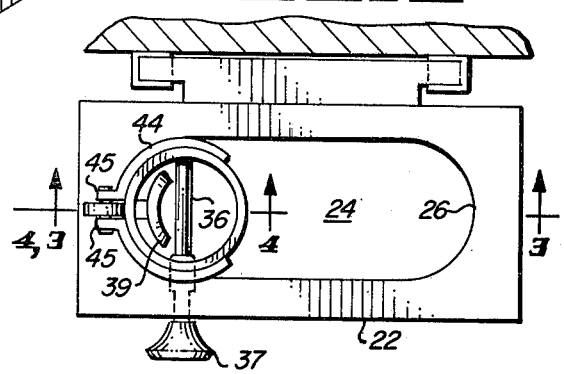
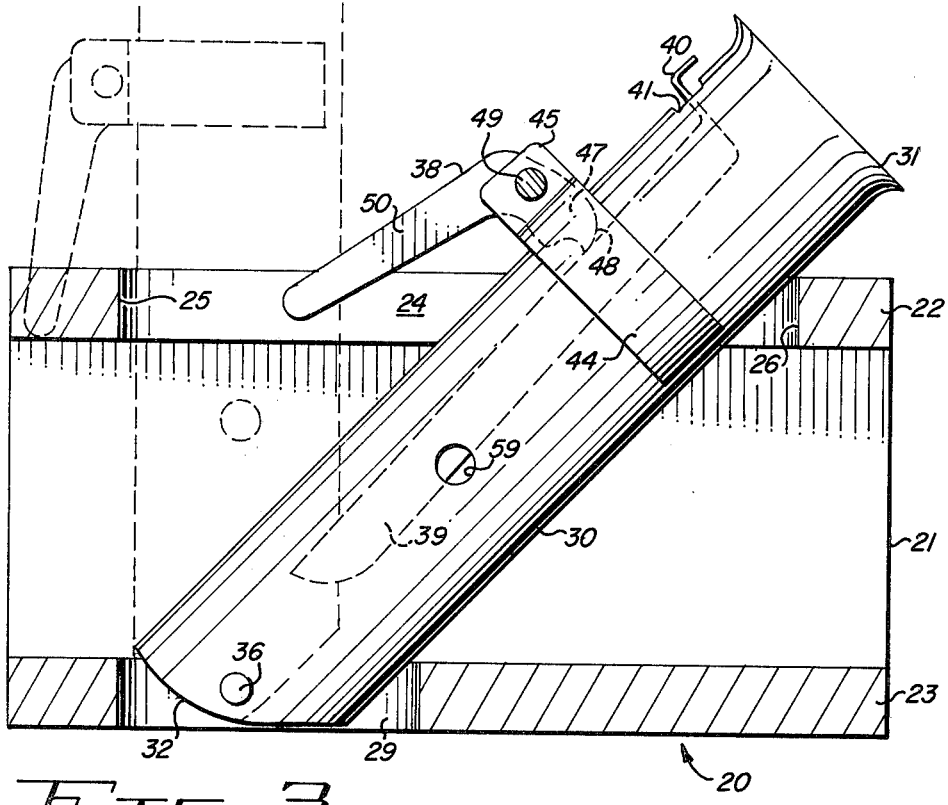
FIG-1
FIG-2
FIG-3

FISHING ROD HOLDER

This invention relates to fishing tackle and accessories.

More specifically, the present invention relates to holders for fishing rods.

In a further aspect the instant invention concerns a fishing rod holder which is variously employable to accommodate trolling, still fishing, surf fishing and other related activities.

Fisherman, whether pursuing their avocation from shore, dock or boat frequently desire to divest themselves of the fishing rod and yet continue fishing. This is especially pronounced when conditions tend to become strenuous or tiresome. For example, trolling with a hand-held rod quickly induces fatigue and materially reduces the enjoyment of the leisure time activity. Still fishing generally does not require constant attention to the fishing rod and provides the fisherman with amply opportunity to engage in other endeavors such as rearranging or inventorying the tackle box, eating or drinking or simply relaxing. At other times the fisherman needs both hands free to change lines or lures or attend to maintenance or repair of the fishing tackle.

In accordance with time honored tradition fisherman have employed numerous makeshift structures for holding fishing rods. The most common examples incorporate a rock or forked stick for resting the pole upon and a rock laid upon the handle. Aboard a boat the rod is simply placed over the edge of the boat with the handle hooked under the fisherman's leg or the seat of the boat. The general requirement is that the rod is free to flex and exert pressure counter to the strike of the fish and that the handle is secured to maintain the rod in the specified position and prevent accidental loss of the fishing rod.

The prior art is replete with various devices for holding fishing rods and improving upon the foregoing crude implementation. Commonly, the prior art devices embody a tubular socket which receives the handle of a fishing pole. Some of the devices include clamping or locking means for retaining the handle within the socket. Associated with the sockets are various types of mounting means. One structure includes a C-clamp type arrangement for affixing the structure to the side of a boat or the edge of a dock. Another prior art device includes a depending pin which is received in an appropriately provided hole. Still another prior art fishing rod holder includes a mounting plate which is permanently secured to a preselected surface. Also incorporated into some of the prior art devices is structure which will permit selective angular positioning of the socket relative to the mounting means. The prior art devices, however, have not thoroughly met the needs and desires of the fisherman as to result in any widespread commercial success.

It would be highly advantageous, therefore, to provide a fishing rod holder which accommodates the varied needs of fisherman.

Accordingly, it is a principal object of the present invention to provide an improved fishing rod holder adapted for use from shore, dock, boat and other locations.

Another object of the present invention is the provision of a fishing rod holder which will accommodate various styles and designs of fishing rods.

Still another object of the present invention is to provide a fishing rod holder having optionally operative locking means for securing the rod therein.

Yet another object of the instant invention is the provision of a fishing rod holder in which the rod may remain while playing a fish or in which the rod is alternatively readily removable after a strike or bite.

And another object of the invention is to provide a fishing rod holder having simplified means for holding the rod at a selected angular relationship to the water level.

A further object of the instant invention is the provision of an immediately available receptacle for receiving and holding the fishing rod and for freeing the fisherman's hands.

A still further object of the invention is the provision of a fishing rod holder which is readily movable from location to location without special modification of the surface to which it is mounted.

And a further object of the invention is the provision of a fishing rod holder in which the rod is held in proper position for setting the hook during a strike.

And yet a further object of the invention is the provision of a fishing rod holder of the above type which is simply and durably yet inexpensively manufactured.

Briefly, to achieve the desired objectives of the present invention, provided is a tubular socket which is open at the upper end for receiving the handle of a fishing rod therein. The handle is optionally secured within the socket by manually operative camming means. The lower end of the tubular socket is pivotally connected to a frame for rotation about a horizontal axis. Stop means carried by the frame limit the pivotal movement of the socket. The socket is also retained in a selective position by detent means.

The frame is adapted to be clamped to any suitable surface. In a further embodiment mounting means are provided for detachably securing the fishing rod holder to a predetermined mounting surface. In a still further embodiment the frame is provided with engagement means for use in connection with accessory devices such as securing to a ground stake or coupling with an outrigger for trolling.

The foregoing and further and more specific objects and advantages of the present invention will become readily apparent to those skilled in the art from the following detailed description of the preferred embodiments thereof taken in conjunction with the drawings in which:

FIG. 1 is an upper frontal perspective view of a fishing rod holder constructed in accordance with the teachings of the present invention;

FIG. 2 is a plan view of the device of FIG. 1;

FIG. 3 is a vertical sectional view taken along the line 3—3 of FIG. 2;

Figure 4:
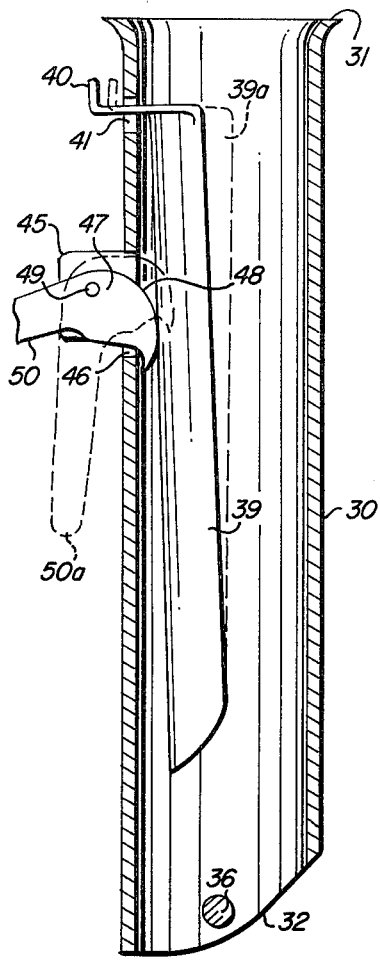
FIG. 4 is a vertical sectional view taken along the lines 4—4 of FIG. 2 and particularly detailing the rod receiving socket thereof.

Turning now to the drawings in which the same reference numerals indicate corresponding elements throughout the several views, attention is first directed to FIG. 1 which shows a preferred embodiment of a fishing rod holder in accordance with the instant invention having a frame generally designated by the reference character 20. As viewed from the end frame 20 is generally C-shaped in cross section as formed by a generally upright member 21 having spaced upper and lower substantially horizontal plate members 22 and 23 extending therefrom. An elongate aperture 24 extends through upper plate member 22 generally parallel to upright member 21 and terminates with rounded ends 25 and 26. Another aperture 29 extends through lower plate member 23.

Tubular socket 30, having upper and lower ends 31 and 32, respectively, is sized to encircle the handle of a conventional fishing rod as shown in dashed outline 33 which is received through upper open end 31. To accommodate insertion of handle 33 into tubular socket 30, end 31 is slightly flared or bell mounted. Tubular socket 30 is loosely received through apertures 24 and 29 and is pivotally connected at lower end 32 thereof to lower plate 23 by pin 36 as is further seen in FIGS. 2 and 3. The limits of pivotal movement of socket 30 are defined by ends 25 and 26 of elongate aperture 24 and socket 30 is selectively retained in a predetermined position by detent means 37 as will be hereinafter explained in detail. Similarly, the selective retention of rod handle 33 within socket 30 by camming means 38 will be further described presently.

With particular reference to FIGS. 2, 3 and 4, the camming means 38 for retaining the handle of a fishing rod within tubular socket 30 is seen in detail. An elongate curvilinear plate 39 resides within socket 30 and is affixed thereto by hook member 40 which extends through aperture 41 within the wall of socket 30. The interaction of hook shaped member 40 through aperture 41 loosely retains plate 39 within socket 30 and prevents accidental separation thereof. Bracket 44 is secured to the outside of tubular socket 30 and serves to carry ears 45 which project from tubular socket 30 on either side of slit 46. Cam 47 having camming surface 48 passes through slit 46 and is pivotal about pin 49 carried by ears 45. Lever handle 50 extends from cam 47.

Referring more specifically to FIG. 4, it is seen that when handle 50 is urged upwardly to extend from socket 30 elongate plate 39 is freely movable but not disengageable with socket 30 as provided by the interaction of hook member 40 through aperture 41. With lever handle 50 in the upward position and plate 30 freely movable handle 33 is inserted into tubular socket 30 through the open end 31 thereof. If it is then desired to secure handle 33 within socket 30 lever arm 50 is urged towards the dashed line position 50A rotating cam 47 bringing camming surface 48 against plate 39 and urging plate 39 inwardly toward dashed line position 39A. Fishing rod handles are generally either straight or have a slight rearward converging taper. As plate 39 is cammed inwardly it is free to form an angle with the opposite wall of tubular socket 30 which will accommodate the configuration of the particular fishing rod handle inserted therein for extended frictional contact and greater holding ability. The fishing rod is instantly released by pulling upwardly upon lever handle 50 and withdrawing the rod in a generally upward motion.

Figure 5:
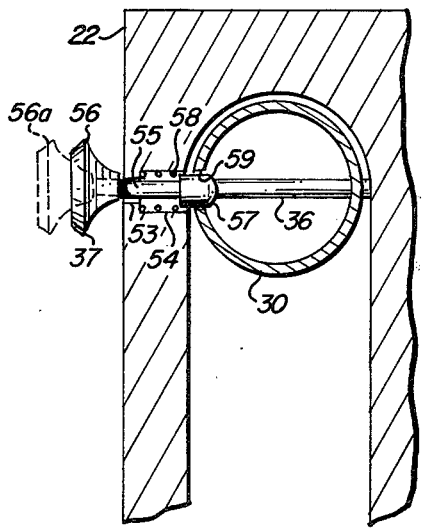
FIG. 5 is a fragementary horizontal sectional view taken along the line 5—5 of FIG. 1 and further illustrating the detent means associated therewith.

As seen in FIG. 3, the pivotal movement of socket 30 about pin 36 is limited by ends 25 and 26 of elongate slot 24. End 26 provides stop means against which socket 30 can bear for supporting the rod in a generally inclined position. Detent means 37, as illustrated in FIG. 5, selectively retains socket 30 in a substantially vertical position. Detent means 37 comprises bore 53 extending through plate 22 from the outside thereof into aperture 24 and having counterbore 54 extending from the direction of elongate aperture 24. Pin 55 is slidable within bore 53 and carries at respective ends thereof knob 56 and plunger 57. Compression spring 58 bears against the backside of plunger 57 to urge plunger 57 inwardly toward aperture 24. Plunger 57 is aligned with holes 59 in tubular socket 30. As socket 30 is moved towards the vertical position as illustrated by the dashed outline 30A in FIG. 3 it bears against plunger 57 and the innate camming ability of the outer curved surface of socket 30 urges plunger 57 into counterbore 54 compressing spring 58. Continued movement of socket 30 aligns hole 59 with plunger 57 whereupon spring 50 urges plunger 57 into hole 59 and positionally retaining socket 30. Subsequently, socket 30 is selectively released by manually pulling knob 56 toward the position indicated by dashed outline 56A.

Figure 6:
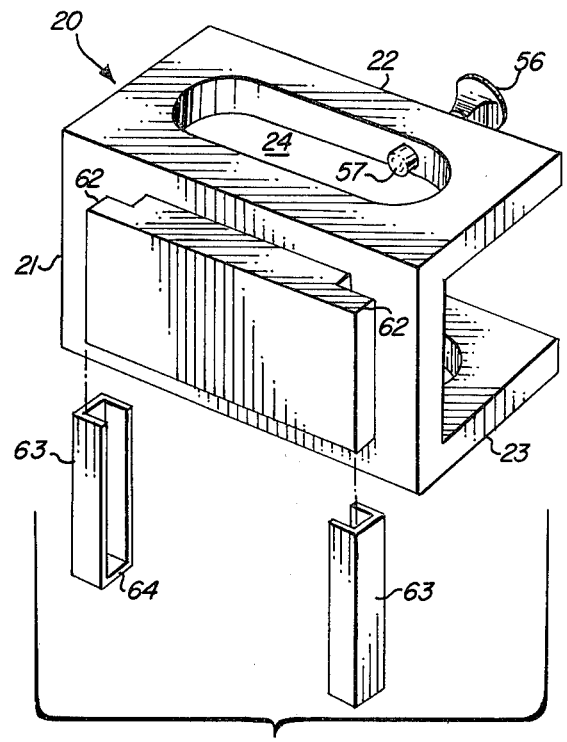
FIG. 6 is an upper rear perspective view of the frame portion of the device of FIG. 1 and showing mounting means associated therewith.

As seen in FIG. 6 the backside of frame 20, specifically upright member 21, carries a pair of opposed projections 62 which are spaced from the surface of the frame. Opposed channels 63 slidably receive projections 62 therein. The movement of projections 62 through channels 63 is stopped by transverse piece 64 at the lower end of channels 63. It is immediately apparent that channels 63 may be mounted to any convenient surface where frequent use of the fishing rod holder of the present invention is desired. Several pairs of channels 63 may be mounted at convenient locations for receiving a single holder.

Figure 7:
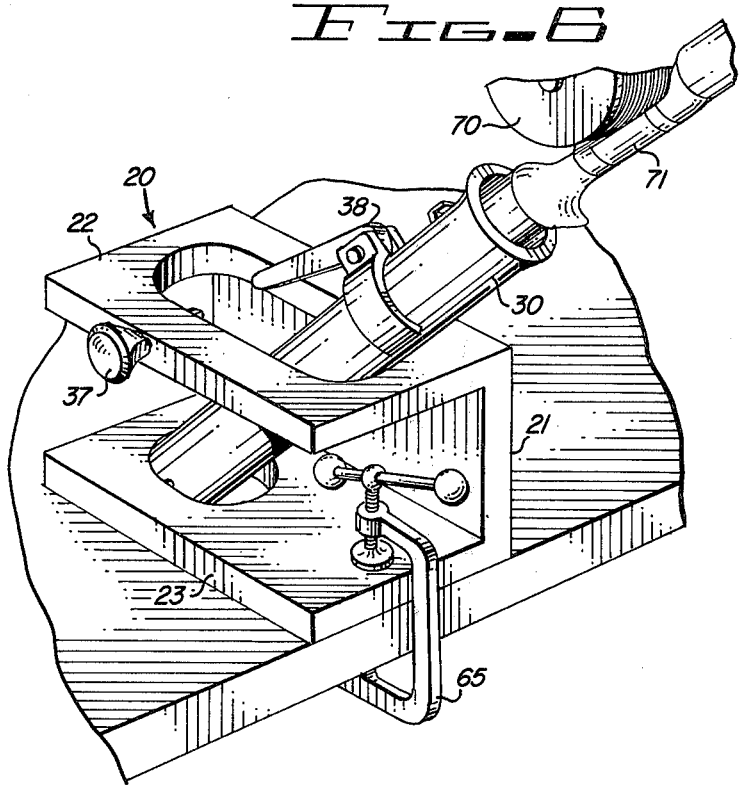
FIG. 7 is a view corresponding to the view of FIG. 1 and showing the device thereof as it would appear when in use and secured to a relatively horizontal surface.
Figure 11:
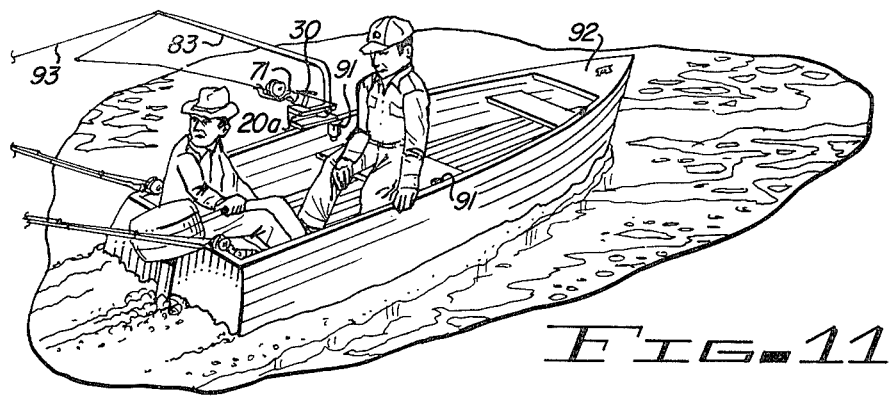
FIG. 11 is a partial representation of fishermen in a row boat and utilizing the fishing rod holder of FIG. 8 in combination with the auxiliary device of FIG. 10.

An alternate mounting means is illustrated in FIG. 7 which shows a conventional C-clamp 65 for securing lower plate 23 to a substantially horizontal surface as might be provided by a dock or other platform. In a similar manner C-clamp 65 can be used for securing upright member 21 to a substantially vertical surface. As noted herein reel 70 carried by fishing rod 71 is free from interference by the fishing rod holder of the instant invention such that reel 70 may be manipulated by the fisherman without removing rod 71 from tubular socket 30.

Figure 8:
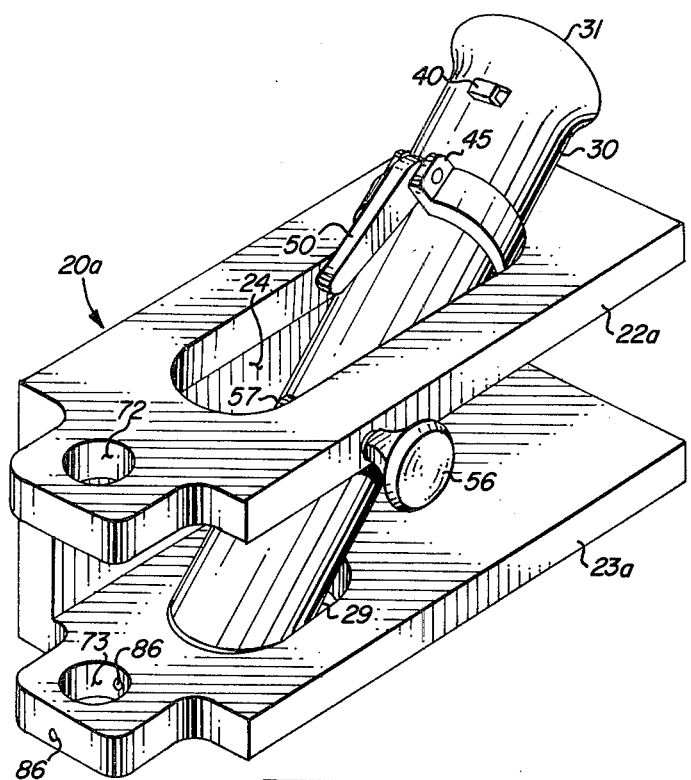
FIG. 8 is an upper frontal perspective view of an alternate embodiment of a fishing rod holder of the instant invention.

FIG. 8 illustrates an alternate embodiment of the instant invention having a modified frame 20A having upper and lower plates 22A and 23A, respectively, which are extended at one end thereof to carry aligned vertical bores 72 and 73, respectively, therethrough. Similarly, with reference to FIG. 9 it is seen that aligned bores 76 and 77 are provided respectively, by bracket 78 secured to one end of upper plate 22 and a corresponding bracket 79 secured to lower plate 23. Bores 72 and 73 and bores 76 and 77 form engagement means for cooperating with an engagement member having an auxiliary device in the form of a projection extending therefrom for increasing the utility of the fishing rod holder of the instant invention.

Figure 10:
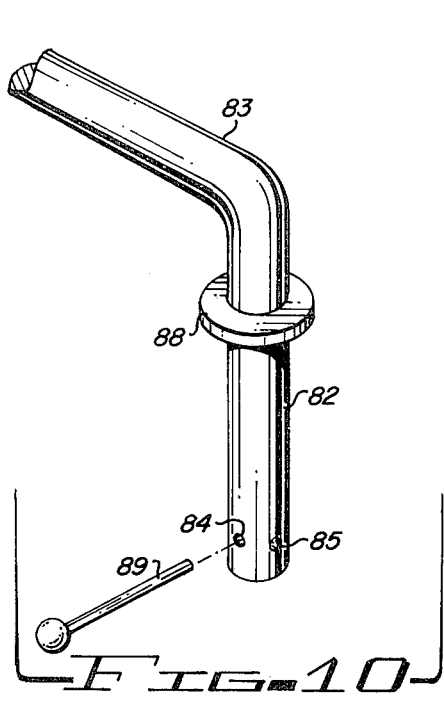
FIG. 10 is a partial perspective view of an auxiliary device, herein specifically illustrated as an outrigger, engageable with and extending the utility of the embodiments of FIGS. 8 and 9.
Figure 9:
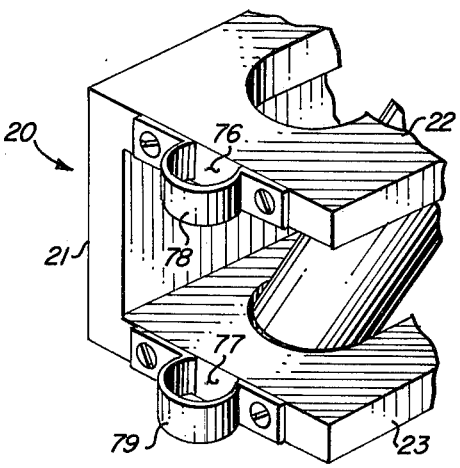
FIG. 9 is a partial perspective view corresponding to the view of FIG. 8 and showing a further modification thereof.

An auxiliary device having an engagement member and a projection extending therefrom for use in combination with the embodiment of FIGS. 8 and 9 is viewed in FIG. 10. The engagement member is an elongate shaft 82 which is received through engagement means provided by bores 72 and 73 or 76 and 77. The projection is an arm 83 which forms an outrigger for holding fishing line during trolling as will be readily understood by fisherman. A pair of angularly disposed bores 84 and 85 extend diametrically through shaft 82. Bores 84 and 85 are alignable with bore 86 passing diametrically through bore 73 in lower plate 23A. Pin 89 is used to pass through bore 84 or 85 selectively and through bore 86 to prevent rotation of the auxiliary device. The weight of the auxiliary device is distributed upon the upper surface of upper plate 22A by collar 88 secured intermediate engagement member 82 and projection 83.

Additional length may be added to shaft 82 to extend below lower plate 23A sufficiently to be received in a conventional oar lock 91 carried by fishing boat 92. Thus the fishing rod holder and the auxiliary device form an integral unit for supporting fishing rod 71 and fishing line 93. The use of the device increases the number of fishing rods and the area that can be effectively covered thereby during trolling especially from conventional fresh water fishing boats in the twelve and fourteen foot class.

Figure 12:
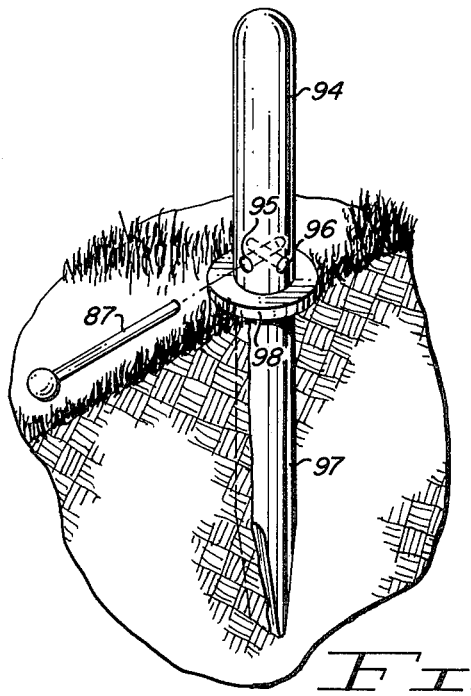
FIG. 12 is a perspective view of an auxiliary device, herein specifically illustrated as a ground stake, engageable with and further extending the utility of the embodiments of FIGS. 8 and 9.

With reference to FIG. 12 the engagement member is a shaft 94 having angularly disposed diametric bores 95 and 96 similar to shaft 82 and engaging with bores 72 and 73 or 76 and 77 in a similar manner and similarly utilizing pin 87. The projection extending therefrom is in the form of ground stake 97. Collar 98 is secured to the auxiliary device intermediate the engagement member and the projection. The instant auxiliary device secures the fishing rod holder of the present invention especially for the purpose of surf fishing or still fishing from shore. It is particularly noted that while the engagement member of the outrigger and the ground stake auxiliary devices each cooperate with the engagement means associated with frames 20 and 20A the directions of coupling thereof are in opposed directions.

Various modifications and changes in the devices herein chosen for purposes of illustration will readily occur to those skilled in the art. For example, the lower plate member of the frame provides suspension for pin 36 and an auxiliary clamping means as seen in FIG. 7. It is appreciated that the lower plate may be discarded without interfering with the pivotal connection of the tubular socket to the frame. Similarly, various modifications may be made to the upper plate and alternate stop and detent means supplied. Also, it is noted that no mention has been made herein of material of construction of the fishing rod holder of the instant invention. Persons in the manufacturing art will readily recognize that various materials are adapted for this purpose especially selected plastics and metals.

Having fully described and disclosed the present invention and the presently preferred embodiments thereof in such clear and concise terms as to enable those skilled in the art to understand and practice the same, the invention claimed is:

1. A fishing rod holder for detachably engaging the handle of a fishing rod and supporting said rod in selective positions, said fishing rod holder comprising:
   a. a frame;
   b. a tubular socket including:
      i. a lower end pivotally connected to said frame for rotation about a horizontal axis, and
      ii. an open upper end for receiving the handle of a fishing rod;
   c. means carried by said socket for operatively securing said handle within said socket;
   d. detent means carried by said frame and engageable with said socket for selectively retaining said socket in a first locked position;
   e. stop means carried by said frame for limiting the pivotal movement of said socket and supporting said socket in a second position; and
   f. said tubular socket means being permitted unrestricted pivotal movement from said second position to said first position and actuating said detent means to said first locked position when said tubular socket is pivoted from said second position to said first position.

2. The fishing rod holder of claim 1, wherein said frame includes a substantially horizontal plate member spaced above the pivotally connected lower end of said socket and having an elongate aperture movably receiving said socket therethrough; the ends of said elongate aperture defining the limits of pivotal movement of said socket.

3. The fishing rod holder of claim 1, further including mounting means for detachably securing said holder to a predetermined mounting surface, said mounting means, comprisng:
   a. a pair of opposed projections extending from said frame;
   b. a pair of opposed channels carried by said mounting surface for slidably receiving said projections therein; and
   c. stop means for limiting the sliding movement of said projections through said channels.

4. The fishing rod holder of claim 1, further including engagement means carried by said frame for cooperating with an engagement member having a projection extending therefrom.

5. The fishing rod holder of claim 4, wherein said projection is a ground stake.

6. The fishing rod holder of claim 4, wherein said projection is an outrigger for holding a fishing line.

* * * * *